United States Patent [19]
Miller

[11] 4,228,697
[45] Oct. 21, 1980

[54] VEHICLE TRANSMISSIONS

[75] Inventor: Albert A. Miller, Galashiels, Scotland

[73] Assignee: AB Volvo, Gothenburg, Sweden

[21] Appl. No.: 848,688

[22] Filed: Nov. 4, 1977

[30] Foreign Application Priority Data

Nov. 5, 1976 [GB] United Kingdom ............... 46221/76

[51] Int. Cl.² ........................................... F16H 57/10
[52] U.S. Cl. ........................................ 74/758; 74/760; 74/762; 74/764
[58] Field of Search ............... 74/759, 758, 753, 761, 74/760, 762, 763, 764, 765, 755, 756

[56] References Cited

U.S. PATENT DOCUMENTS

| | | | |
|---|---|---|---|
| 3,349,641 | 10/1967 | Crosswhite et al. | 74/763 |
| 3,863,524 | 2/1975 | Mori et al. | 74/759 |
| 4,089,238 | 5/1978 | Förster et al. | 74/759 |
| 4,089,239 | 5/1978 | Murakami et al. | 74/759 |

FOREIGN PATENT DOCUMENTS

| | | | |
|---|---|---|---|
| 2065398 | 8/1973 | Fed. Rep. of Germany | 74/753 |
| 1230474 | 5/1971 | United Kingdom . | |
| 1230738 | 5/1971 | United Kingdom . | |
| 506709 | 7/1976 | U.S.S.R. | 74/758 |

*Primary Examiner*—Allan D. Herrmann
*Attorney, Agent, or Firm*—Blanchard, Flynn, Thiel, Boutell & Tanis

[57] ABSTRACT

Multi-ratio epicyclic change-speed gearing comprises at least three epicyclic gear trains or gear sets, with the planet carrier of the first gear set rotationally secured to the ring gear of the second gear set and an input is connected to the sun gear of the first gear set. Means are provided for holding the ring gear of the first gear set and/or the sun gear of the second gear set against driving reactions. The ring gear of the third gear set is rotationally secured to the planet carrier of the second gear set, the planet carrier of the third gear set is rotationally secured to the sun gear of the second gear set and further holding means are provided for holding the sun gear of the third gear set. As a result, the lower ratios are more widely spaced than the ratios nearer unity.

6 Claims, 3 Drawing Figures

4,228,697

VEHICLE TRANSMISSIONS

FIELD OF THE INVENTION

This invention relates to change-speed transmission for vehicles.

BACKGROUND OF THE INVENTION

There is now increasing use of epicyclic change-speed transmissions in heavier vehicles such as trucks and long distance buses since epicyclic gears are capable of transmitting high torques and also lend themselves to automatic control, thereby reducing driver fatigue. The incorporating of a torque converter, with its capability of torque multiplication, in the input to the transmission enables the latter to have fairly widely spaced ratios since the losses in the torque converter when acting as a torque multiplier are found to be acceptable for short periods, for example when accelerating the vehicle from rest. When the vehicle has attained its cruising speed, the transmission will normally be in direct drive (when en bloc rotation of its epicyclic gearing) and the torque converter will be acting as a two-element fluid coupling (i.e. its coupling state, without torque multiplication) or may be locked-up by means of a lock-up clutch.

A problem then arises when the vehicle encounters an uphill gradient sufficient to slow the vehicle down below its cruising speed and into the torque-multiplication range of the torque converter if the lock-up clutch of the latter is disengaged. The transmission becomes less efficient with a corresponding reduction in available power. If the next lower ratio is engaged, to enable the torque converter to operate in its coupling range, the vehicle must be appreciably slowed down to avoid overspeeding the engine in view of the large step between this ratio and direct drive.

Thus, an object of the present invention is to provide an epicyclic vehicle transmission in which the lower ratios are relatively widely spaced while the ratios nearer to unity are relatively closely spaced while at the same time avoiding the use of a separate splitter in series with the main unit, in view of the difficulties in obtaining synchronisation of operation of two such units in series.

SUMMARY OF THE INVENTION

According to the present invention, there is provided epicyclic change-speed gearing comprising at least three epicyclic gear trains or gear sets, each comprising a sun gear, an internally toothed ring gear and at least one planet pinion which meshes with both the sun gear and the ring gear and is itself mounted for rotation about its axis in a planet carrier which is mounted for rotation about the common axis of the sun gear and ring gear, in which for example the output is taken from the planet carrier of the first gear set, the planet carrier of the first gear set is rotationally secured to the ring gear of the second gear set, an input is connected to the sun gear of the first gear set, and means are provided for holding the ring gear of the first gear set and/or the sun gear of the second gear set against driving reactions and clutch means may be provided for selectively connecting the input to the sun gear of the second gear set, characterised in that the ring gear of the third gear set is rotationally secured to the planet carrier of the second gear set, the planet carrier of the third gear set is rotationally secured to the sun gear of the second gear set and further holding means are provided for holding the sun gear of the third gear set.

If desired, first clutch means may be provided for disengaging the input from the sun gear of the first gear set and second clutch means are then engageable to transmit the drive from the input to the sun gear of the second gear set to provide a reverse drive or alternatively an overdrive ratio, and third clutch means may be provided to transmit the drive from the input to the planet carrier of the second gear set to provide selectively two further overdrive ratios.

Additional ratios may be obtained by inserting a fourth epicyclic gear set between the planet carrier of the first gear set and the output, the output then being connected to the planet carrier of the fourth gear set while the planet carrier of the first gear set is rotationally secured to the ring gear of the fourth gear set and the sun gear of the fourth gear set is rotationally secured to the sun gear of the first gear set. With such an arrangement, in addition to the overdrive ratios which are optionally obtainable, a still further overdrive ratio may be obtained by connecting the input drive only to the planet carrier of the first gear set.

If required, an additional low ratio can be obtained by adding a fifth epicyclic gear set having its ring gear connected to the output shaft, its sun gear rotationally secured to the ring gear of the fourth gear set while its planet carrier is provided with selectively operable holding means.

BRIEF DESCRIPTION OF THE DRAWINGS

Embodiments of the invention will now be described by way of example with reference to the accompanying drawings, in which.

DESCRIPTION OF PREFERRED EMBODIMENTS

Figure 1:
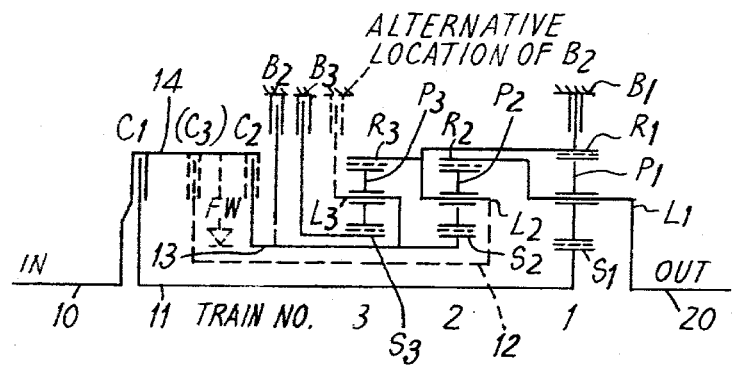
FIG. 1 shows diagrammatically the layout of the change-speed gearing in accordance with one embodiment of the invention.

In the transmission shown in FIG. 1, an input shaft 10 is secured to the input of a clutch C1 the output of which is secured to a shaft 11. The transmission has three epicyclic gear sets 1, 2 and 3 each having a sun gear S, an internally toothed ring gear R, a set of planet pinions P which mesh with both the sun gear and the ring gear and are mounted for rotation about their axes in a planet carrier L which is itself mounted for rotation about the common axis of the transmission.

The shaft 11 is connected to the sun gear S1. The planet carrier L1 is connected to the output member 20 of the transmission and to the ring gear R2 of the second gear set. The planet carrier L2 of the second gear set is connected to the ring gears R1 and R3 of the first and third gear sets and may optionally be connected by means of a hollow sleeve 12 surrounding the shaft 11 to the output side of a clutch C3. A hollow sleeve 13 connects the sun gear S2 of the second gear set and the planet carrier L3 of the third gear set to the output member of a clutch C2 the input member of which is connected by a cylindrical wall 14 to the inputs of the clutches C1 and C3 and thus to the input member 10. Selectively operable braking means (or clutches) B1, B2 and B3 are independently energisable to hold respectively the ring gear R1, the sun gear S2 and the sun gear S3 stationary. Alternative positions for the second braking means, on opposite sides of the third braking means, are shown in FIG. 1.

If the numbers of teeth in the various elements of the epicyclic gear trains are as follows:

| Train: | 3 | 2 | 1 |
|---|---|---|---|
| No. of teeth in: | | | |
| ring gear | 78 | 78 | 84 |
| planet pinions | 21 | 21 | 28 |
| sun gear | 36 | 36 | 28 | then the ratios obtained by engaging the various clutches and brakes are as shown in Table I.

TABLE I

| 1st speed = 4.00 | :1 | C1 + B1 |
|---|---|---|
| 2nd speed = 1.95 | :1 | C1 + B2 |
| 3rd speed = 1.38 | :1 | C1 + B3 |
| 4th speed = 1.00 | :1 | C1 + C2 (or C3) |
| 5th speed = 0.873 | :1 | C3 + B3 |
| 6th speed = 0.684 | :1 | C3 + B2 |
| 7th speed = 0.597 | :1 | C2 + B3 |
| REVERSE = 2.17 | :1 | C2 + B1 |

Figure 2:
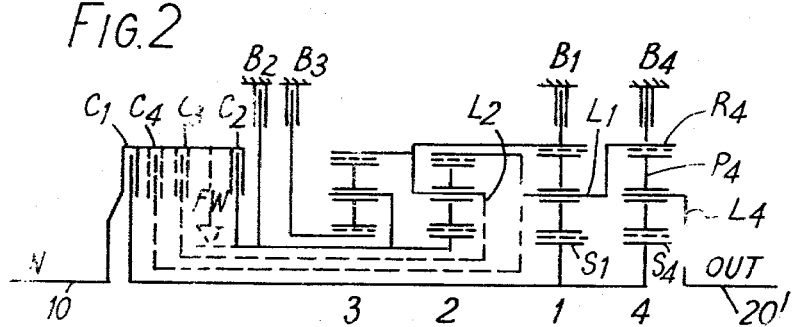
FIGS. 2 and 3 show diagrammatically the layout of the change-speed gearing in accordance with two additional embodiments of the invention.

The embodiment shown in FIG. 2 differs from that shown in FIG. 1 in that a fourth epicyclic gear set 4, the individual elements of which, in this embodiment, have the same number of teeth as the corresponding elements of the first gear train 1, is incorporated between the first gear train 1 and the output shaft 20'. The planet carrier L4 of the fourth gear train is connected to the output member 20', the sun gear S4 is rotationally secured to the sun gear S1 and the ring gear R4 is rotationally secured to the planet carrier L1 and is provided with fourth braking means B4 capable of holding it stationary. The resultant ratios are set in Table II.

TABLE II

| 1st speed = 4.00 | :1 | C1 + B4 |
|---|---|---|
| 2nd speed = 2.286 | :1 | C1 + B1 |
| 3rd speed = 1.574 | :1 | C1 + B2 |
| 4th speed = 1.261 | :1 | C1 + B3 |
| 5th speed = 1.00 | :1 | C1 + C2 |
| REVERSE = −4.22 | :1 | C2 + B4 |
| HIGH REVERSE = −1.24 | :1 | C2 + B1 |
| OVERDRIVE = 0.545 | :1 | C2 + B3 |

By engaging the clutch C2 and the brake B3, an overdrive ratio of 0.545:1 is obtainable.

The optional clutches C3 and C4 shown in FIG. 2 for establishing drives respectively to the planet carrier L2 and L1, with the tooth numbers quoted above, the following additional ratios become available.

| 6th speed = 0.913 | :1 | C4 + B3 |
|---|---|---|
| 7th speed = 0.808 | :1 | C4 + B2 |
| 8th speed = 0.797 | :1 | C3 + B3 |
| 9th speed = 0.553 | :1 | C3 + B2 |
| HIGH REVERSE = −1.333 | :1 | C3 + B4 |

Figure 3:
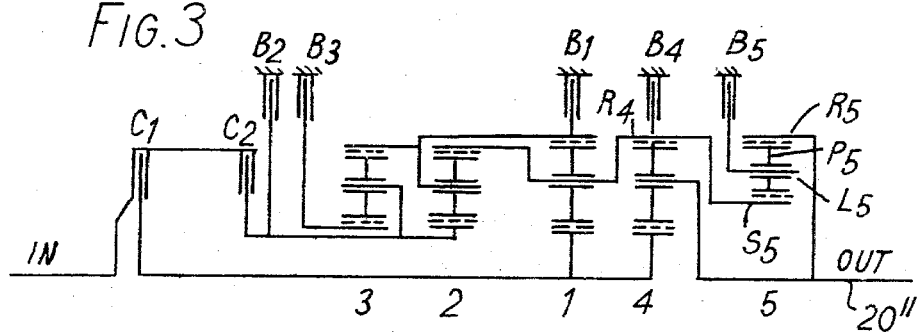

In the embodiment shown in FIG. 3, a fifth epicyclic gear train 5 is included and has its ring gear R5 secured to the output member 20'', its sun gear S5 rotationally secured to the ring gear R4 while its planet carrier L5 is provided with braking means B5. If the ring gear R5 has 84 teeth, the planet gears P5 each have 18 teeth and the sun gear S5 has 48 teeth while the components of the other trains have the same numbers of teeth as in the embodiment described with reference to FIG. 2, an extra low ratio of 9.25:1 is obtainable by engaging clutch C1 and brake B5 and the extra low reverse ratio of −13.36:1 is obtainable by engaging clutch C2 and brake B5. Two further reverse ratios of −5.42:− and −1.75:1 are obtainable respectively by energizing clutches C3 or C4 (as well as brake B5) if clutches C3 and-/or C4 are provided.

A free-wheel FW may be incorporated between the members 13 and 14 when either or both clutch C3 and C4 are installed and its function is to facilitate a smooth transition from direct (en bloc) drive to any of the overdrive ratios available when either C3 or C4 is engaged, or vice versa.

It will be apparent that if FW is adapted to prevent the sun of gear train 2 rotating faster than the input member in the same rotational direction, the direct drive can be transmitted by engaging either of the overdrive clutches C3 or C4 alone (so long as the torque is positive). Thus any other clutches which may be engaged to provide a locked direct drive (either positive or negative torque) can be disengaged in advance of engaging the brake which together with clutch C3 or C4 provides the overdrive ratio. This enables the transition to be accomplished without loss of driving torque through the transmission. The same applies to the transition from overdrive ratio to direct drive, provided the same sequence of brake and clutch operation is reversed.

If in FIG. 1 the 28-tooth sun of train 1 were exchanged for one having 42 teeth and the 28-tooth planets were exchanged for planets having 21 teeth then the ratios would be modified as follows:

| 1st speed = 3.0 | :1 |
|---|---|
| 2nd speed = 1.63 | :1 |
| 3rd speed = 1.254 | :1 |
| 4th speed = 1.00 | :1 |
| 5th speed = 0.873 | :1 |
| 6th speed = 0.684 | :1 |
| 7th speed = 0.597 | :1 |
| REVERSE = −2.17 | :1 |

It will thus be seen that each of the embodiments described above provides indirect forward ratios the steps between which become smaller as the ratios approach unity. In addition, overdrive ratios are available, without incorporating additional gearing.

I claim:

1. In an epicyclic change-speed gearing comprising at least three epicyclic gear sets drivingly connectable between an input and an output, each gear set comprising a sun gear, a planet carrier, an internally toothed ring gear and at least one planet pinion which meshes with both the sun gear and the ring gear of its respective gear set and is itself mounted for rotation about its axis in said planet carrier which is mounted for rotation about the common axis of the sun gear and ring gear of its respective gear set, in which the planet carrier of the first gear set is rotationally secured to the ring gear of the second gear set, the input is connected to the sun gear of the first gear set, the output being taken from the planet carrier of the first gear set, and means are provided for holding at least one of the ring gear of the first gear set and the sun gear of the second gear set against driving reactions, the improvements in which the ring gear of the third gear set is rotationally secured to the planet carrier of the second gear set, the planet carrier of the third gear set is rotationally secured to the sun gear of the second gear set, and further holding means are provided for holding the sun gear of the third gear set.

2. Epicyclic change-speed gearing according to claim 1, in which first clutch means are provided for disengaging the input from the sun gear of the first gear set and second clutch means are then engageable to transmit the drive from the input to the sun gear of the second gear set to provide a reverse drive or alternatively an overdrive ratio.

3. Epicyclic change-speed gearing according to claim 2, in which third clutch means is provided for selectively transmitting the drive from the input to the planet carrier of the second gear set to provide selectively two further overdrive ratios.

4. Epicyclic change-speed gearing according to claim 1 and including a fourth epicyclic gear set between the planet carrier of the first gear set and the output, the output being connected to the planet carrier of the fourth gear set while the planet carrier of the first gear set is rotationally secured to the ring gear of the fourth gear set and the sun gear of the fourth gear set is rotationally secured to the sun gear of the first gear set.

5. Epicyclic change-speed gearing according to claim 4 and including a fifth epicyclic gear set having its ring gear connected to the output, its sun gear rotationally secured to the ring gear of the fourth gear set and selectively operable holding means for the planet carrier of the fifth gear set.

6. Epicyclic change-speed gearing according to claim 1, and including clutch means for selectively connecting the input to the ring gear of the second set.

* * * * *